US012780230B2

(12) United States Patent
Viswavarapu et al.

(10) Patent No.: US 12,780,230 B2
(45) Date of Patent: Nov. 3, 2026

(54) METHODS AND SYSTEMS FOR DETERMINING IMPAIRED DRIVING

(71) Applicant: Toyota Motor North America, Inc., Plano, TX (US)

(72) Inventors: Lokesh Kumar Viswavarapu, Frisco, TX (US); Raja Shekar Kilaru, Addison, TX (US); Mehmet Cil, Allen, TX (US); Varun Prasad, Princeton, TX (US); Masahiro Muramatsu, The Colony, TX (US); Naohiro Matsumura, Dallas, TX (US); Sergei I. Gage, Dallas, TX (US); Pujitha Gunaratne, Northville, MI (US); Jennifer Lerman, Dallas, TX (US); Michael R. Kushnerik, The Colony, TX (US); Schuyler J. St. Lawrence, Annandale, VA (US); Swathi Manoravi, Anupuram (IN); Aarthi Ranganathan, Chennai (IN); Dharm Sidhu, Plano, TX (US); Sangeeta Gupta, Frisco, TX (US); Joseph Cook, Frisco, TX (US); Chandan Mazumdar, McKinney, TX (US); Pankaj Devgun, Frisco, TX (US); Jaya Kumari, Plano, TX (US); Andrew R. Gordon, Grapevine, TX (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 106 days.

(21) Appl. No.: 18/631,276

(22) Filed: Apr. 10, 2024

(65) Prior Publication Data

US 2025/0319893 A1 Oct. 16, 2025

(51) Int. Cl.
*B60W 50/12* (2012.01)
*B60W 40/08* (2012.01)
(Continued)

(52) U.S. Cl.
CPC ............ *B60W 50/12* (2013.01); *B60W 40/09* (2013.01); *G06V 20/58* (2022.01); *H04L 12/40* (2013.01);
(Continued)

(58) Field of Classification Search
CPC .. B60W 50/12; B60W 40/09; B60W 2556/10; B60W 2556/45;
(Continued)

(56) References Cited

U.S. PATENT DOCUMENTS

| | | | | |
|---|---|---|---|---|
| 2019/0332106 | A1* | 10/2019 | Belloni Mourao .... | B60K 28/06 |
| 2020/0101981 | A1* | 4/2020 | Phillips .................. | G07C 5/085 |

(Continued)

FOREIGN PATENT DOCUMENTS

| | | | |
|---|---|---|---|
| CN | 106184222 | B | 8/2019 |
| CN | 110286667 | A | 9/2019 |

(Continued)

OTHER PUBLICATIONS

El Masri, Ahmad El Basiouni et al., "Toward self-policing: Detecting drunk driving behaviors through sampling CAN bus data", 2017 International Conference on Electrical and Computing Technologies and Applications (ICECTA), Nov. 21-23, 2017, pp. 1-5.

(Continued)

*Primary Examiner* — Jerrod Irvin Davis
(74) *Attorney, Agent, or Firm* — Dinsmore & Shohl LLP

(57) ABSTRACT

Methods and systems for determining impaired driving is provided. The methods include acquiring controller area network (CAN) data and location data of a vehicle, comparing the CAN data to a reference data associated with (Continued)

driving behavior of a driver of the vehicle, determining the driver is impaired driving in response to determining that a level of deviation of the CAN data from the reference data is greater than a threshold value, changing the threshold value in response to determining that the location data indicates the vehicle is located in an area associated with a place offering access to alcohol, and controlling operations of the vehicle in response to determining that the driver is impaired driving.

20 Claims, 7 Drawing Sheets

(51) Int. Cl.

| | |
|---|---|
| ***B60W 40/09*** | (2012.01) |
| ***B60W 50/00*** | (2006.01) |
| ***G06V 20/58*** | (2022.01) |
| ***H04L 12/40*** | (2006.01) |

(52) U.S. Cl.

CPC ............... *B60W 2040/0836* (2013.01); *B60W 2050/0029* (2013.01); *B60W 2420/403* (2013.01); *B60W 2556/10* (2020.02); *B60W 2556/45* (2020.02); *G06V 2201/08* (2022.01); *H04L 2012/40215* (2013.01); *H04L 2012/40273* (2013.01)

(58) Field of Classification Search

CPC . B60W 2040/0836; B60W 2050/0029; B60W 2420/403; G06V 20/58; G06V 2201/08; H04L 12/40; H04L 2012/40215; H04L 2012/40273

See application file for complete search history.

(56) References Cited

U.S. PATENT DOCUMENTS

| | | | | |
|---|---|---|---|---|
| 2020/0139977 | A1 * | 5/2020 | Govindjee ............ | B60W 40/09 |
| 2021/0316720 | A1 * | 10/2021 | Dewey .................. | B60W 10/18 |
| 2022/0051340 | A1 | 2/2022 | Rose et al. | |
| 2022/0095975 | A1 * | 3/2022 | Aluf ....................... | A61B 3/113 |

FOREIGN PATENT DOCUMENTS

| | | | |
|---|---|---|---|
| GB | 2551511 | B | 6/2019 |
| JP | 2009029374 | A | 2/2009 |
| KR | 1020150086911 | A | 7/2015 |

OTHER PUBLICATIONS

Deuber, Robin et al., "DRIVE: In-Vehicle Drunk Driving Detection", Online Article, Bosch IoT Lab, Accessed on Dec. 5, 2022.

* cited by examiner

METHODS AND SYSTEMS FOR DETERMINING IMPAIRED DRIVING

TECHNICAL FIELD

The present disclosure relates to impaired driving determination and, more particularly, to determining impaired driving by utilizing controller area network (CAN) data.

BACKGROUND

As background, impaired driving (e.g., driving under the influence of alcohol or drugs, or the like) of a vehicle is a pressing issue. Sensors, such as in-cabin image detectors, touch alcohol detectors, and breath alcohol detectors may be utilized for detecting impaired driving. However, the sensor data may not be reliable since the sensor data may be altered or unstable. The embodiments provided herein may provide reliable detection of impaired driving by using controller area network (CAN) data obtained from a vehicle.

SUMMARY

In accordance with one embodiment of the present disclosure, a method for determining impaired driving is provided. The method includes acquiring controller area network (CAN) data and location data of a vehicle, comparing the CAN data to a reference data associated with driving behavior of a driver of the vehicle, determining the driver is impaired driving in response to determining that a level of deviation of the CAN data from the reference data is greater than a threshold value, changing the threshold value in response to determining that the location data indicates the vehicle is located in an area associated with a place offering access to alcohol, and controlling operations of the vehicle in response to determining that the driver is impaired driving.

In accordance with another embodiment of the present disclosure, a system for determining impaired driving is provided. The system includes a vehicle having a controller area network (CAN) system and a controller. The controller is configured to acquire CAN data and location data of the vehicle, compare the CAN data to a reference data associated with driving behavior of a driver of the vehicle, determine the driver is impaired driving when a level of deviation of the CAN data from the reference data is greater than a threshold value, and change the threshold value when the location data indicates the vehicle is located in an area associated with a place offering access to alcohol.

These and additional features provided by the embodiments described herein will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods and systems for impaired driving detection. In embodiments disclosed herein, CAN data of a vehicle may be compared with reference data. The reference data may be associated with a driver of the vehicle and represent a normal driving pattern of the driver (e.g., a driving pattern of the driver when not under the influence of alcohol or when not impaired). The reference data may be model data that is generated from historical CAN data or training data tailored to represent the normal driving pattern of the driver. The model data may be generated by training a machine learning model to represent the normal driving pattern. The CAN data may be compared with the reference data to determine whether the driver is impaired driving. The location data may indicate a current location of the vehicle. In response to determination that the current location is associated with an area associated with a place offering access to alcohol, the comparison between the CAN data and the reference data may be modified based on the determination. For example, when the current location is determined to be associated with the area associated with the place offering access to alcohol, a deviation threshold (e.g., a difference between the CAN data and the reference data) may be lowered to increase sensitivity of the determination of impaired driving.

Figure 1A:
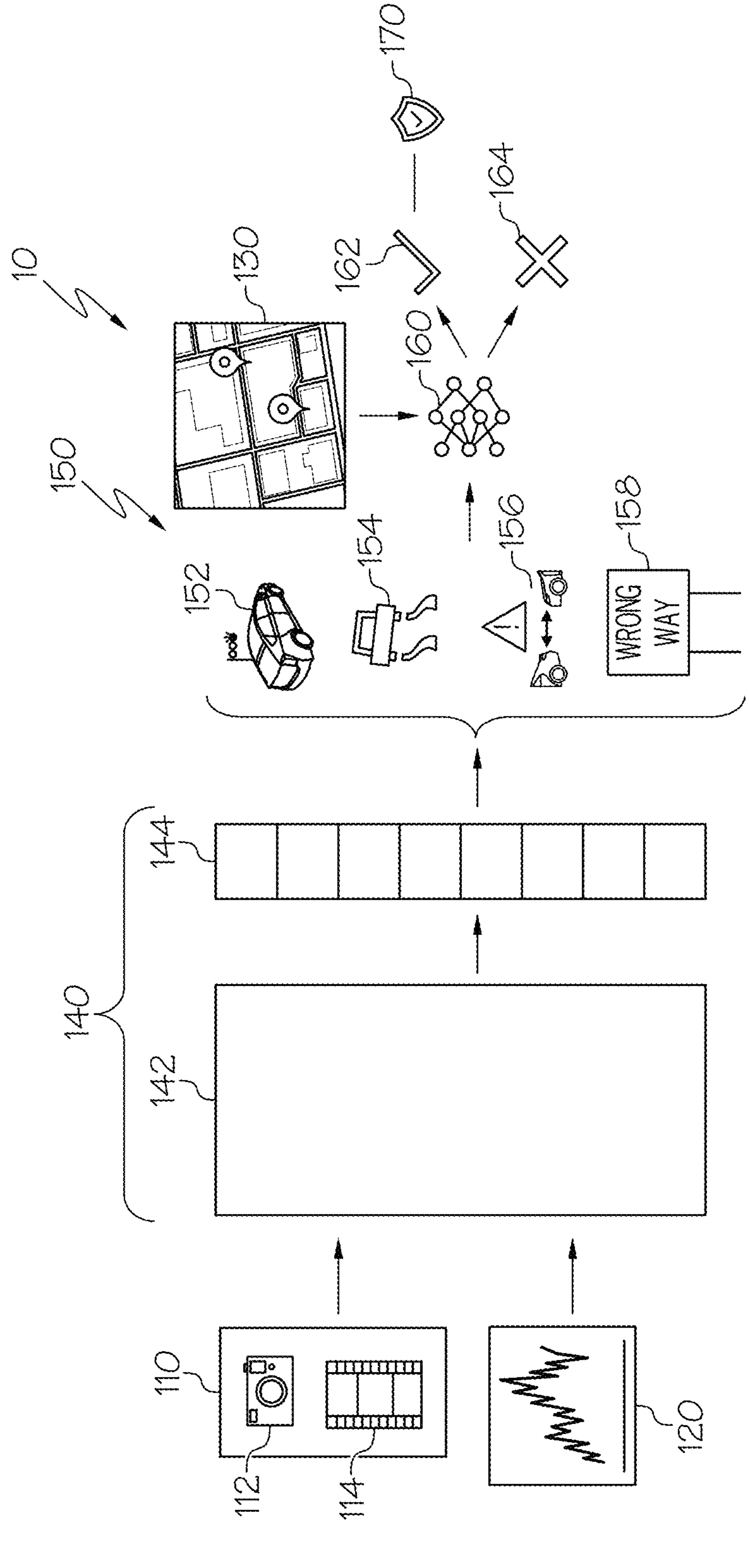
FIG. 1A depicts a schematic diagram of a system, according to one or more embodiments shown and described herein.

Referring to FIG. 1A, a system 10 determining impaired driving of a driver of a vehicle is depicted. Various data may be utilized to detect impaired driving. The various data may include CAN data 120 and environmental data 110 from the vehicle (e.g., a vehicle 202 in FIG. 1B). The environmental data 110 may include image data 112 and/or video data 114 from a front facing camera (e.g., a camera 219 of the vehicle 202 in FIG. 1B) or data from any other sensors such as radar sensors, lidar sensors, etc. The CAN data 120 (e.g., current CAN data) may be accumulated as historical CAN data. The environmental data 110 may be associated with an environment surrounding the vehicle. For example, the environmental data may provide information related to traffic signals, traffic signs, other vehicles in the vicinity of the vehicle, time of the day (e.g., brightness of the environment), or the like. The various data obtained from the vehicle may be used to train a machine learning model 140 to generate models (e.g., reference data) to determine impaired driving.

In embodiments, the machine learning model 140 may include a multi modal transformer 142 representing at least a portion of the machine learning model 140 that has been trained to process feature embeddings 144 of multiple types of data (e.g., the various data including CAN data 120 and/or the environmental data 110) and generate output based on the feature embeddings 144. The multi modal transformer 142 is referred to as "multi modal" since the multi modal transformer 142 may process features of both environmental data 110 and CAN data 120. The multi modal transformer 142 may include any suitable machine learning based structure used to process multi modal features. The feature embeddings 144 are generated by a process of converting raw input data (e.g., the various data including CAN data 120 and/or the environmental data 110) into a lower dimensional, continuous vector representation that retains the essential information needed for a given task. The process is also referred to as feature extraction or feature learning.

The models generated by the machine learning model 140 may include reference data. The reference data may be associated with driving behavior of the driver of the vehicle. In embodiments, the reference data is associated with previous driving behavior of the vehicle. The reference data may be obtained based on the CAN data 120 acquired from previous driving of the driver of the vehicle. In embodiments, the reference data may be obtained based on a normal driving pattern learned from model data (e.g., model data representing normal driving behavior of the driver).

The system 10 may determine driving behavior of the driver of the vehicle based on the CAN data 120 (e.g., the current CAN data). The driving behavior 150 may be current driving behavior of the driver of the vehicle. The driving behavior 150 may include a traffic signal obedience pattern 152, a weaving pattern 154 (e.g., a lateral acceleration pattern), a tailgating pattern 156 (e.g., an inter-vehicle distance pattern), a traffic sign obedience pattern 158, or the like. The driving behavior 150 may indicate the driver is impaired. In embodiments, the driving behavior 150 may be determined based on comparison between the reference data (e.g., the model data) and the CAN data 120 (e.g., a determination step 160). The impaired driving or the normal driving of the driver may be determined based on a level of deviation of the CAN data 120 from the reference data. In embodiments, the impaired driving is determined (e.g., determination of impaired driving 162) when the level of the deviation is greater than a threshold value. In embodiments, the normal driving of the driver may be determined (e.g., determination of normal driving 164) when the level of the deviation is less than or equal to the threshold value. Further details of the impaired driving determination process will be discussed with reference to FIGS. 2-4B and 6.

In embodiments, the threshold value may be changed based on location data 130. The location data 130 may be received from the vehicle, a personal device (e.g., a personal device 240 in FIG. 2B), or the like. The location data 130 may represent the current location of the vehicle, point of interest (POI) location, or the like. The location data 130 may include map data represents a map image which may be displayed on a display. In embodiments, the threshold value may be changed in response to determining that the location data 130 indicates the vehicle is located in an area associated with a place offering access to alcohol. Further details of the location data 130 will be discussed with reference to FIGS. 5 and 6.

A vehicle intervention system 170 may be activated in response to the determination of the impaired driving. When the impaired driving is determined, operations of the vehicle may be controlled by the vehicle intervention system 170. For example, the vehicle intervention system 170 may take control over the vehicle for safety when the impaired driving is determined. The vehicle intervention system 170 may send a notification to interested parties (e.g., the driver, family members, law enforcement entities, or the like) via an application. In embodiments, the vehicle intervention system 170 may disable the vehicle such that the vehicle is no longer operable when the driver is determined to be impaired driving. For example, the engine of the vehicle may be disabled in response to the driver is determined to be impaired driving. In embodiments, the vehicle intervention system may disable the vehicle for human driving such that the vehicle is no longer operable by the driver when the driver is determined to be impaired driving. For example, the vehicle intervention system 170 may activate an autonomous driving mode such that to prevent the driver from impaired driving of the vehicle.

Figure 1B:
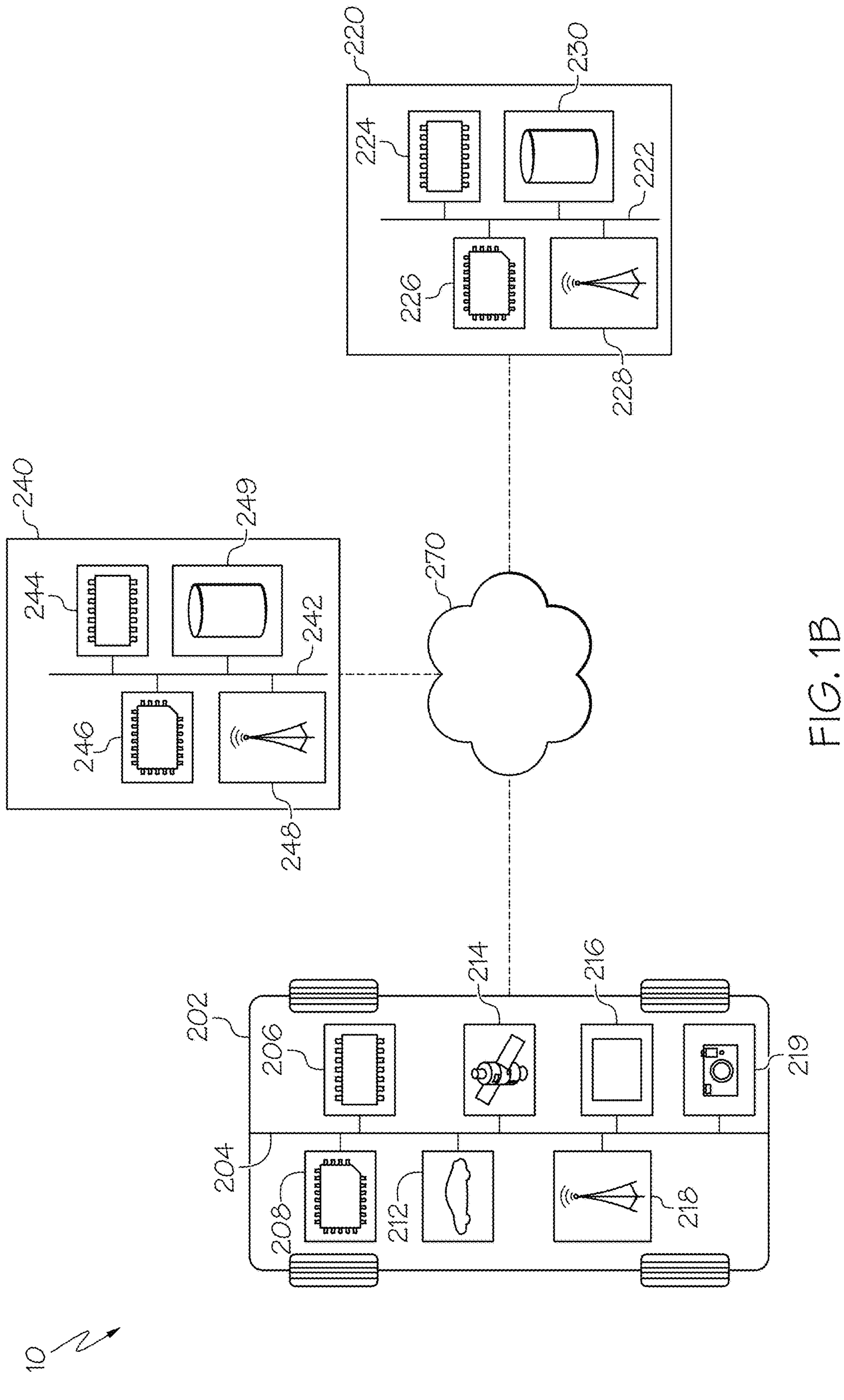
FIG. 1B depicts a schematic diagram of the system of FIG. 1A comprising a vehicle and a server, according to one or more embodiments shown and described herein.

Referring now to FIG. 1B, a schematic diagram of the system 10 comprising the vehicle 202, the personal device 240, and a server 220 is depicted. The vehicle 202 may include a processor 208, a memory 206, a driving assist module 212, a network interface 218, a location module 214, an input/output interface (e.g., an I/O interface 216 in FIG. 1B), and the camera 219 (e.g., a front facing camera). The vehicle 202 also may include a communication path 204 that communicatively connects the various components of the vehicle 202.

The processor 208 may include one or more processors that may be any device capable of executing machine-readable and executable instructions. Accordingly, each of the one or more processors of the processor 208 may be a controller, an integrated circuit, a microchip, or any other computing device. The processor 208 is coupled to the communication path 204 that provides signal connectivity between the various components of the connected vehicle. Accordingly, the communication path 204 may communicatively couple any number of processors of the processor 208 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 204 may be formed from any medium that is capable of transmitting a signal such as, e.g., conductive wires, conductive traces, optical waveguides, and the like. In some embodiments, the communication path 204 may facilitate the transmission of wireless signals, such as Wi-Fi, Bluetooth®, Near-Field Communication (NFC), and the like. Moreover, the communication path 204 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium. The system 10 may collect and analyze CAN data from the CAN bus (e.g., the communication path 204) of the vehicle 202.

The memory 206 is coupled to the communication path 204 and may contain one or more memory modules comprising RAM, ROM, flash memories, hard drives, or any device capable of storing machine-readable and executable instructions such that the machine-readable and executable instructions can be accessed by the processor 208. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory 106. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented on any conventional computer programming language, as pre-programmed hardware elements, or as a combination of hardware and software components.

The vehicle 202 may also include a driving assist module 212. The driving assist module 212 is coupled to the communication path 204 and communicatively coupled to the processor 208. The driving assist module 212 may include sensors such as LiDAR sensors, RADAR sensors, optical sensors (e.g., cameras), laser sensors, proximity sensors, location sensors (e.g., GPS modules), and the like. The vehicle data gathered by the sensors may be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, autonomous driving, and/or the like.

The vehicle 202 also comprises a network interface 218 that includes hardware for communicatively coupling the vehicle 202 to the server 220. The network interface 218 can be communicatively coupled to the communication path 204 and can be any device capable of transmitting and/or receiving data via a network or other communication mechanisms. Accordingly, the network interface 218 can include a communication transceiver for sending and/or receiving any wired or wireless communication. For example, the hardware of the network interface 218 may include an antenna, a modem, a LAN port, a Wi-Fi card, a WiMAX card, a cellular modem, near-field communication hardware, satellite communication hardware, and/or any other wired or wireless hardware for communicating with other networks and/or devices. The vehicle 202 may connect with one or more other connected vehicles and/or external processing devices (e.g., the server 220) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A location module 214 is coupled to the communication path 204 such that the communication path 204 communicatively couples the location module 214 to other modules of the vehicle 202. The location module 214 may comprise one or more antennas configured to receive signals from a GPS satellite tracking system. In embodiments, the location module 214 may include one or more conductive elements that interact with electromagnetic signals transmitted by the GPS satellite tracking system. The received signal may be transformed into a data signal indicative of the location (e.g., latitude and longitude) of the location module 214, and consequently, the vehicle 202.

The vehicle 202 may include the I/O interface 216. The I/O interface 216 may be disposed inside the vehicle 202 such that an occupant of the vehicle 202 may see. The I/O interface 216 may allow for data to be presented to a human driver and for data to be received from the driver. For example, the I/O interface 216 may include a screen to display information to a user, speakers to present audio information to the user, and a touch screen that may be used by the user to input information. The I/O interface 216 may output information that the vehicle 202 received from the server 220. For example, the I/O interface 216 (e.g., a navigation device) may display instructions to follow a route generated by the server 220, such as turn-by-turn instructions. The I/O interface 216 may receive input of a destination to generate the route. The vehicle 202 may be an autonomous vehicle that traverses the route.

In embodiments, the vehicle 202 may be communicatively coupled to the server 220 by a network 270 via the network interface 218. The network 270 may be a wide area network, a local area network, a personal area network, a cellular network, a satellite network, and the like. The server 220 may include a processor 226, a memory component 224, a network interface 228, a database 230, and a communication path 222. Each server 220 component is similar in features to its connected vehicle counterpart, described in detail above. It should be understood that the components illustrated in FIG. 1B are merely illustrative and are not intended to limit the scope of this disclosure. More specifically, while the components in FIG. 1B are illustrated as residing within vehicle 202, this is a non-limiting example. In embodiments, one or more of the components may reside external to vehicle 202, such as with the server 220.

The personal device 240 may include a processor 246, a memory component 244, a network interface 248, an I/O device 249, and a communication path 242. Each component of the personal device 240 is similar in features to its connected vehicle counterpart, described in detail above. The I/O device 249 may provide an interface for the user to input information or data. In embodiments, bidirectional communication is provided between the personal device 240 and the server 220. The information received from the personal device 240 may be transmitted to the server 220. The information may be further transmitted from the server 220 to others, such as other personal devices or vehicles. The server 220 may transmit information stored in the server 220 to the personal device 240.

In embodiments, the server 220 may store a variety of vehicle and user related data in the database 230 of the server 220. In the illustrative embodiment disclosed, the database 230 may include CAN data (e.g., the CAN data 120), or the like. The CAN data 120 may be utilized for utilizing data associated with the vehicle system and performance. Thus it could provide driver history, vehicle diagnostic, and maintenance data. The relevant vehicle CAN data may be uploaded to the server 220. Furthermore, data associated with the personal device 240 may also be stored on the server 220. The vehicle 202 may interface with more than one device brought into the vehicle 202. The server 220 may further store data associated with the vehicle 202, such as user settings, voice recognition data, and data related to interaction carried while driving, such as but not limited to advertisement bookmarks, location bookmarks, point of interest (POI) information (e.g., hours, location, menu, ratings, or the like), traffic, weather, or the like. Although the illustrative embodiments provide the database 230 storing the CAN data, personal device data from the personal device 240, vehicle data from the vehicle 202 may be stored. For example, the database 230 may store the vehicle manufacturer data and more.

It should be understood that the components illustrated in FIG. 1B are merely illustrative and are not intended to limit the scope of this disclosure. More specifically, while the components in FIG. 1B are illustrated as residing within the vehicle 202, this is a non-limiting example. In some embodiments, one or more of the components may reside external to vehicle 202, such as with the server 220.

Figure 2:
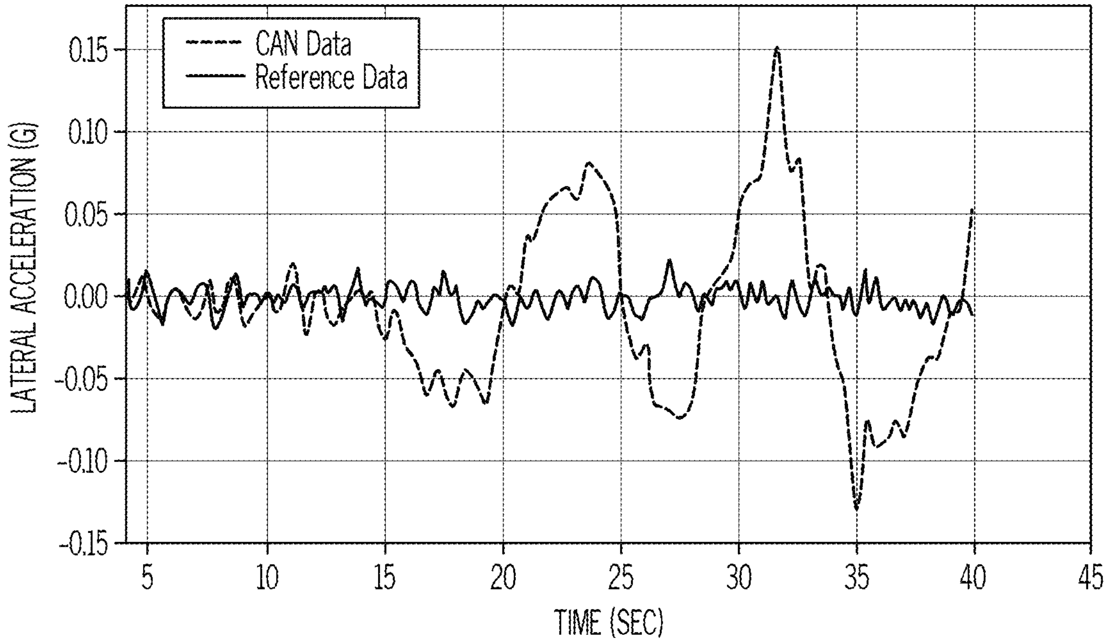
FIG. 2 depicts a graph of a lateral acceleration pattern (e.g., a driving pattern) of the vehicle of FIG. 1B, according to one or more embodiments shown and described herein.

Exemplary embodiments of determination of impaired driving will be discussed with reference to FIGS. 2-5. Referring to FIG. 2, the system 10 may compare a driving pattern generated based on the CAN data and a reference driving pattern from the reference data to determine impaired driving. In embodiments, the reference data may be obtained based on a normal driving pattern learned from model data (e.g., the machine learning model 140). In some embodiments, the reference data may be an average of normal driving data of vehicles in a certain area. A graph shown in FIG. 2 represents the driving pattern illustrated in a dotted line generated from the CAN data and the reference driving pattern illustrated in a solid line generated from the reference data. A vertical axis of the graph indicates lateral acceleration (G), and a horizontal axis of the graph indicates time (Sec.). The lateral acceleration may represent a magnitude of weaving (e.g., a vehicle moves back and forth sideways, such as moving between lanes, also known as lane hopping), which may be a sign of impaired driving.

When a level of deviation of the driving pattern generated from the CAN data from the reference driving pattern is greater than a threshold value, the driving pattern derived from the CAN data may be determined as an impaired driving pattern. For example, the difference in the lateral acceleration between the CAN data and the reference data is greater than 0.05 G multiple times during a timeframe between 15 and 40 seconds. In this case, if the threshold value is set 0.05 G, the system 10 may determine that the driving pattern generated from the CAN data represents an impaired driving pattern.

In embodiments, the reference data may be modified based on the environmental data (e.g., traffic lights, road condition, distance between vehicles, distance from an object, or the like). The environment data may be obtained from the camera 219 (e.g., the front facing camera) and/or the driving assist module 212 (e.g., radar, LiDAR, or the like). In embodiment, impaired driving may be determined based on the CAN data and the environmental data.

Figure 3A:
FIG. 3A depicts an image showing a traffic sign, according to one or more embodiments shown and described herein.
Figure 3B:
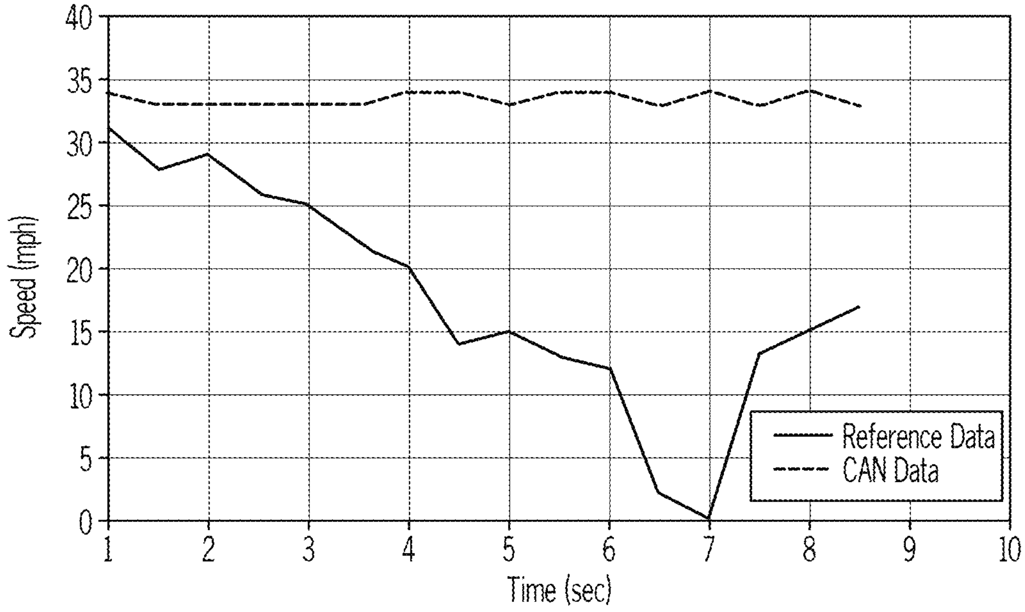
FIG. 3B depicts a graph of a driving speed of the vehicle of FIG. 1B, according to one or more embodiments shown and described herein.

Referring to FIGS. 3A and 3B, impaired driving may be determined based on obedience to traffic signs (e.g., road symbol signs, traffic lights, or the like). In FIG. 3A, an image 30 (e.g., an image of a view of the vehicle 202) may be processed to identify a traffic sign. The image 30 (e.g., an image taken by the camera 219 of the vehicle 202) may indicate that a do not enter sign 31, a stop sign 33, and a traffic light 35 are present in the vision of the driver or in the vicinity of the vehicle 202. The image 30 may constitute the environment data, and the reference data may be modified to determine a driving pattern associated with obedience to traffic signals or signs in response to the environment data includes a traffic sign. A relevant portion of data from the CAN data may be obtained to be compared with the reference data. In embodiments, speed of a vehicle may be compared between the CAN data and the reference data.

A graph shown in FIG. 3B represents the driving pattern illustrated in a dotted line generated from the CAN data and the reference driving pattern illustrated in a solid line generated from the reference data. A vertical axis of the graph indicates speed (mph) (e.g., a speed of the vehicle 202), and a horizontal axis of the graph indicates time (Sec.). In embodiments, a parameter (e.g., the speed) may be selected based on the environmental data. For example, the speed is selected because the speed is associated with the traffic sign. The speed may represent a magnitude of obedience to traffic signs. For example, the speed may represent driving maneuver of the driver of the vehicle 202, such as speeding, maintaining a certain speed, slowing down, or stopping, which may be a sign of impaired driving. In embodiments, the parameter may include speed, longitudinal acceleration, lateral acceleration, orientation, yaw rate, or the like).

When a level of deviation of the driving pattern generated from the CAN data from the reference driving pattern is greater than a threshold value, the driving pattern derived from the CAN data may be determined as an impaired driving pattern. For example, the difference in the speed between the CAN data and the reference data is greater than 15 mph during a timeframe between 5 and 8 seconds. In this case, if the threshold value is set 15 mph, the system 10 may determine that the driving pattern generated from the CAN data represents an impaired driving pattern. For another example, the speed of the reference data, which indicates a normal driving pattern, is 0 mph at 7 seconds. Therefore, the normal driving pattern of the reference data represents that a vehicle should have stopped at the time of 7 seconds. On the other hand, the CAN data indicates that the vehicle 202 did not stop at the stop sign 33. In this case, the threshold value may be set to 0 mph to verify that the vehicle has stopped at the stop sign 33. For another example, when the do not enter sign 31 is present in the vision of the driver, the normal driving pattern of the reference data may represents that a vehicle should have stopped or turned around to avoid entering an area beyond the do not enter sign 31. In this case, location data (e.g., location data obtained from the location module 214 of the vehicle 202) may be also utilized to determine impaired driving. For example, the location of the vehicle 202 obtained from the location data may indicate whether the vehicle 202 entered the area beyond the do not enter sign 31. The location data may increase accuracy of determination of impaired driving.

Figure 4A:
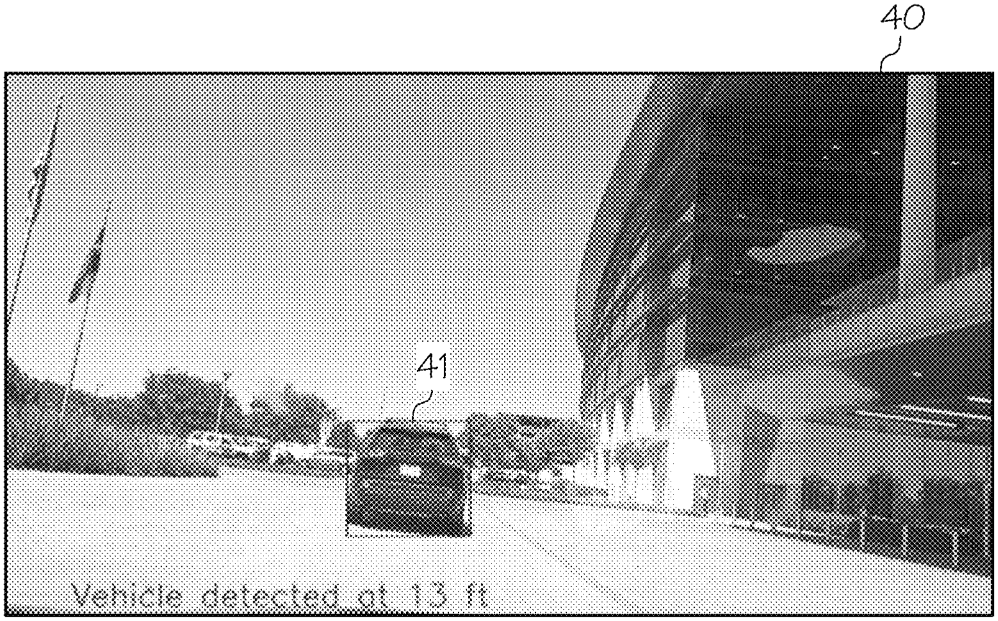
FIG. 4A depicts an image showing a vehicle in front of the vehicle of FIG. 1B, according to one or more embodiments shown and described herein.
Figure 4B:
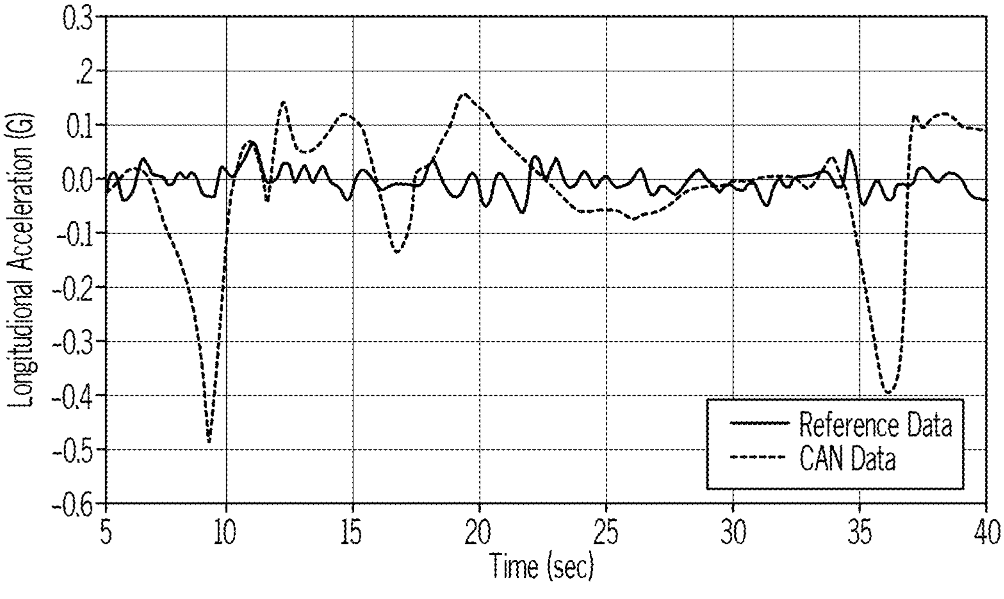
FIG. 4B depicts a graph of a longitudinal acceleration of the vehicle of FIG. 1B, according to one or more embodiments shown and described herein.

Referring to FIGS. 4A and 4B, impaired driving may be determined based on vehicle following behavior. The vehicle following behavior may represent interaction between two adjacent vehicles travelling on the same road. For example, the vehicle following behavior may include a driving pattern of a vehicle following another vehicle driving in front of the vehicle. When the driving pattern indicates that the vehicle is following the other vehicle too close, the driving pattern may indicate that the vehicle is tailgating the other vehicle (e.g., aggressive driving, or the like). In FIG. 3A, an image 40 (e.g., an image of a view of the vehicle 202) may be processed to identify another vehicle 41 within a predetermined distance of the vehicle 202. The image 40 (e.g., an image taken by the camera 219 of the vehicle 202) may indicate that the other vehicle 41 is present in the vision of the driver or in the vicinity of the vehicle 202. A distance between the vehicle 202 and the other vehicle 41 may be determined based on the environment data which may include the image 40 obtained from the camera 219 (e.g., the front facing camera) and/or the sensor data obtained from the driving assist module 212 (e.g., radar, LiDAR, or the like), for example.

The image 40 may constitute the environment data, and the reference data may be modified to determine a driving pattern associated with the vehicle following behavior in response to the environment data includes the other vehicle 41. A relevant portion of data from the CAN data may be obtained to be compared with the reference data.

A graph shown in FIG. 4B represents the driving pattern illustrated in a dotted line generated from the CAN data and the reference driving pattern illustrated in a solid line generated from the reference data. A vertical axis of the graph indicates longitudinal acceleration (G) and a horizontal axis of the graph indicates time (Sec.). In embodiments, a parameter associated with the vehicle following behavior may be selected in response to the identification of the other vehicle 41 within a predetermined distance of the vehicle. For example, longitudinal acceleration of a vehicle may be compared between the CAN data and the reference data. The longitudinal acceleration may represent following behavior of a vehicle. For example, the longitudinal acceleration may represent tailgating, which may be a sign of impaired driving.

When a level of deviation of the driving pattern generated from the CAN data from the reference driving pattern is greater than a threshold value, the driving pattern derived from the CAN data may be determined as an impaired driving pattern. For example, the difference in the longitudinal acceleration between the CAN data and the reference data is greater than 0.3 G during a timeframe between 5 and 10 seconds and during a timeframe between 35 and 40 seconds. In this case, if the threshold value is set 0.3 G, the system 10 may determine that the driving pattern generated from the CAN data represents an impaired driving pattern.

In embodiments, the threshold discussed above with reference to FIGS. 2-4B may be percent deviation, or the like that may represent a numerical value of deviation of the CAN data from the reference data. In embodiments, the environmental data may include time of day or day of week, which may be utilized in determination of impaired driving. For example, a driving pattern may be different between daytime and nighttime due to vision change. The deviation threshold level may be increased during nighttime compared to daytime since driver's average reaction time is generally longer during nighttime then daytime. Conversely, the deviation threshold level may be decreased during daytime compared to nighttime.

Figure 5:
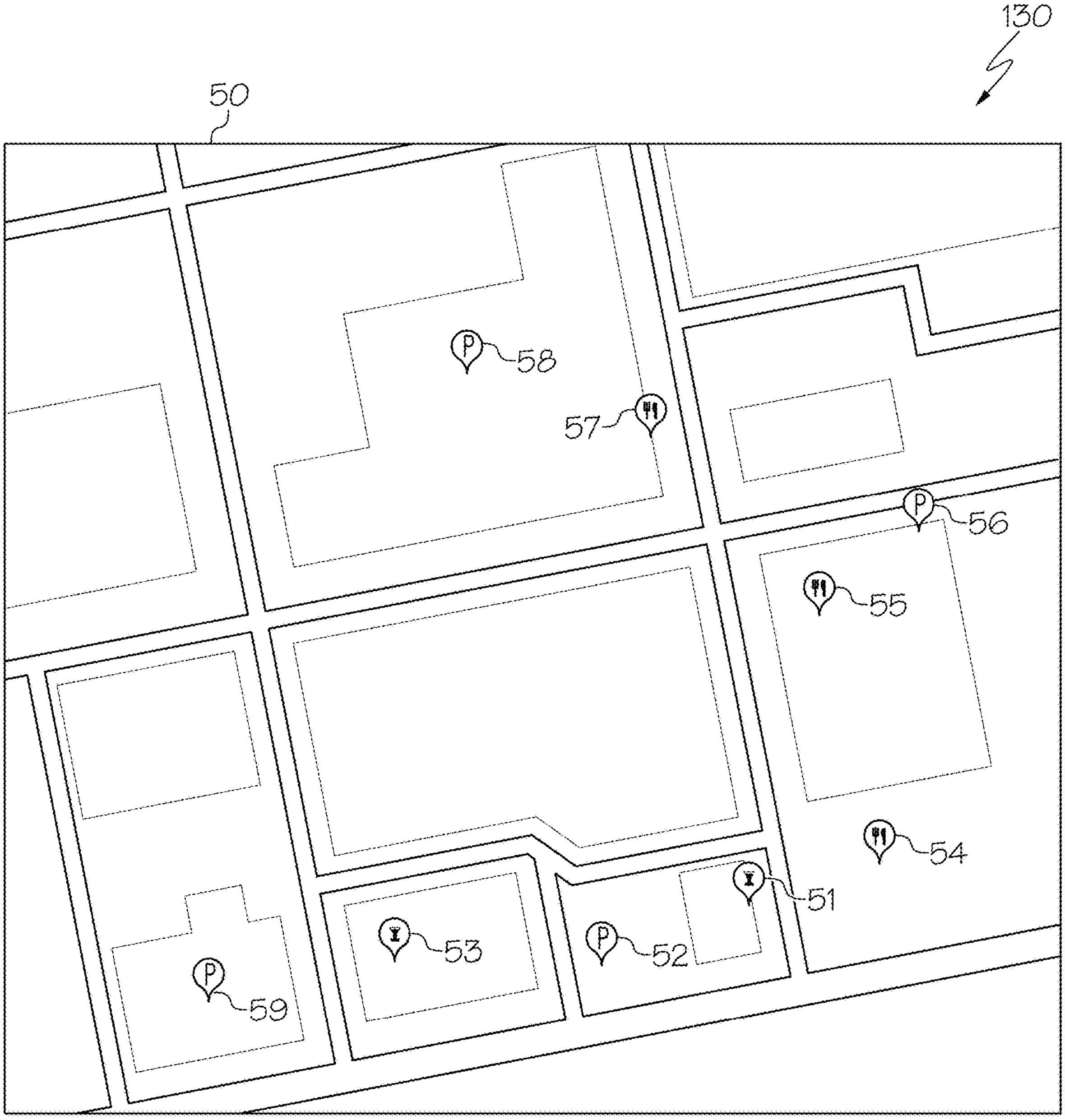
FIG. 5 depicts a map, according to one or more embodiments shown and described herein.

Referring to FIG. 5, the location data 130 discussed above with reference to FIG. 1A is depicted as a map image 50. The map image 50 illustrates locations of bars 51, 53, restaurants 54, 55, 57 and parking lots 52, 56, 58, 59. The location data 130 of the vehicle 202 may indicate that the vehicle is located near the bars 51, 53. In embodiments, when the location data 130 indicates that the vehicle 202 is located near a place serving alcoholic beverages, the system 10 may set the deviation threshold lower than when the vehicle 202 is located away from the place serving alcoholic beverages. For example, the vehicle 202 may be parked at the parking lot 52 of the bar 51 or at the parking lot 59 adjacent to the bar 53 based on the location data 130. The system 10 may decrease the deviation threshold level so that to increase sensitivity of impaired driving determination. In embodiments, the location data 130 may be acquired based on the location data from the driving assist module 212 from the location sensors (e.g., GPS modules) and/or the POI tracking information of the vehicle 202. The location data 130 may be acquired from the personal device 240 of the driver. For example, the location of the personal device 240 may be used as the location data 130. For another example, the location data 130 may be acquired from navigation data from the vehicle 202 (e.g., a destination location, or the like).

Figure 6:
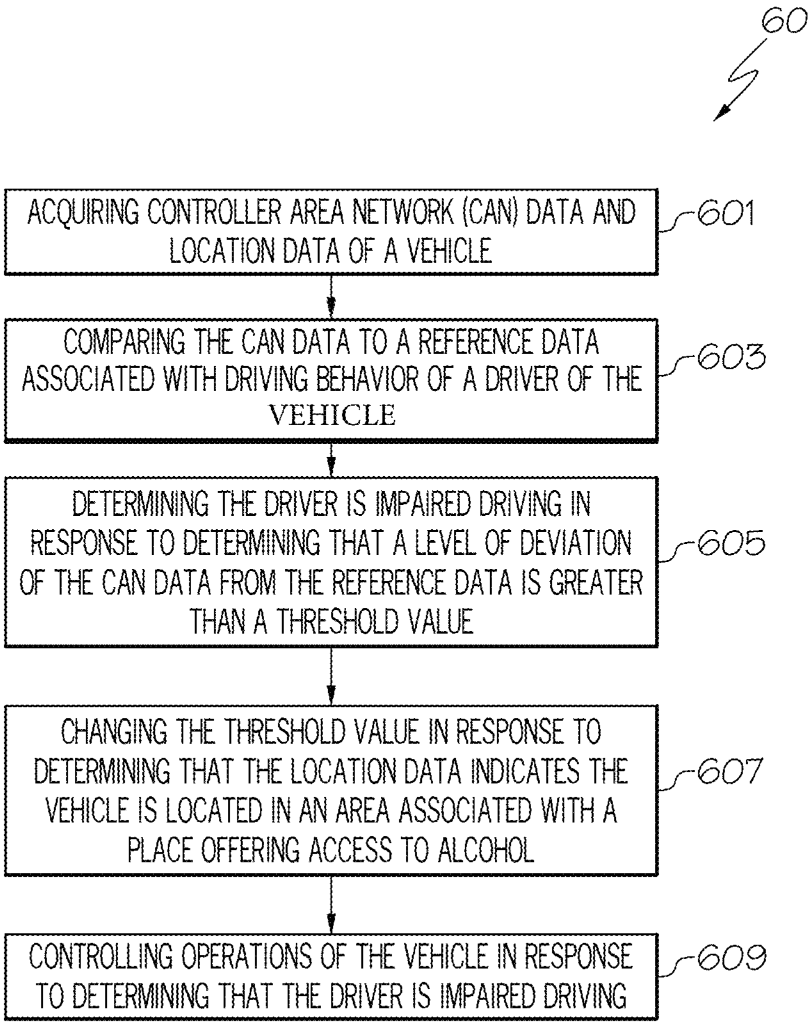
FIG. 6 depicts a flowchart of a method that may be performed by the vehicle and/or server of FIG. 1B, according to one or more embodiments shown and described herein.

Referring to FIG. 6, a flowchart of a method 60 that may be performed by the vehicle 202 and/or server 220 of FIG. 1B is depicted. At step 601, CAN data (e.g., the CAN data 120) and location data (e.g., the location data 130) of the vehicle 202 may be acquired. The CAN data may include forward and aft G forces (e.g., longitudinal G forces), right and left G forces (e.g., lateral G forces), operations of a steering, a brake, an accelerator, and an engine, and rotational speed of each wheel. In embodiments, the CAN data may include historical CAN data and current CAN data. The location data may include a location of the vehicle. In embodiments, the location data may include historical location data and current location data. In embodiments, the CAN data and the location data may be utilized to determine driving behavior of the vehicle (e.g., a driver of the vehicle). When the CAN data is combined with the location data, accuracy of determination of the driving behavior may increase.

At step 603, the CAN data is compared to reference data associated with driving behavior of a driver of the vehicle 202. The reference data may be model data learned from historical CAN data of the vehicle and/or training data that is specifically tailored for purposes of learning the driving behavior of the driver. In embodiments, the reference data may represent normal driving behavior (e.g., not impaired driving behavior or driving behavior without the influence of alcohol or drugs). For example, the reference data may represent normal driving behavior of the driver of the vehicle 202.

At step 605, the driver is determined to be impaired driving in response to determining that a level of deviation of the CAN data from the reference data is greater than a threshold value. In embodiments, the current CAN data may be compared to the reference data to determine the level of the deviation of the current CAN data from the reference data. A parameter to be compared between the CAN data and the reference data may be selected from various parameters that may be obtained from the CAN data and the reference data. For example, the parameters may include lateral acceleration, longitudinal acceleration, speed (e.g., operations of a brake, an accelerator, and an engine, rotational speed of each wheel, or the like), and operations of steering wheel, or the like. In embodiments, the threshold value may be percent deviation or differences between a parameter of the CAN data and the parameter of the reference data. In embodiments, the threshold value may be initially set based on the reference data.

At step 607, the threshold value is changed in response to determining that the location data indicates the vehicle is located in an area associated with a place offering access to alcohol. When the location data indicates the vehicle is located in the area associated with the place offering access to alcohol (e.g., bars, certain restaurant offering alcoholic beverages, or the like), the driver of the vehicle located in the area may have higher possibility of being under the influence of alcohol. Therefore, the threshold may be lowered (e.g., the level of deviation may be decreased) to provide sensitive determination of impaired driving. In embodiments, whether the vehicle is located in the area may be determined based on a distance from the place offering access to alcohol. In embodiments, the vehicle may be determined to be located in the area when the vehicle stayed in the area for more than a certain amount of time (e.g., the vehicle engine turned off for the certain amount of time, the vehicle speed was zero for the certain amount of time, or the like).

At step 609, operation of the vehicle is controlled in response to determining that the driver is impaired driving. In embodiments, the vehicle may be rendered undrivable (e.g., the vehicle may be slow down or stopped) or the vehicle may switch to an autonomous driving mode (e.g., the driver may not manually drive the car). A notification may be sent to the interested parties in response to determining that the driver is impaired driving. The notification may be sent prior to taking control over the operation of the vehicle as a warning sign. The notified party may have an authority to take over the operation of the vehicle (e.g., remote driving, or the like). The notification may be sent after control over the operation of the vehicle is taken over. The operation of the vehicle may be controlled by the vehicle (e.g., an autonomous driving mode of the vehicle 202, the personal device 240, and/or the server 220.

It should now be understood that methods and systems for determining impaired driving is provided. The methods or systems may utilize CAN data, and compared the CAN data with a reference data which is associated with a driver of the vehicle. The reference data may represent a normal driving pattern of the driver (e.g., a driving pattern of the driver when not under the influence of alcohol or when not impaired). The reference data may be generated by training a machine learning model to represent the normal driving pattern. The CAN data may be compared with the reference data to determine whether the driver is impaired driving. Location data indicating a current location of the vehicle may also be utilized. In response to the current location is determined to be associated with an area associated with a place offering access to alcohol, the comparison between the CAN data and the reference data may be modified based on the determination. For example, when the current location is determined to be associated with the area associated with the place offering access to alcohol, a deviation threshold (e.g., a difference between the CAN data and the reference data) may be lowered to increase sensitivity of the determination of impaired driving.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method for determining impaired driving comprising:

acquiring controller area network (CAN) data and location data of a vehicle;

comparing a value of a parameter included in the CAN data to a value of the parameter included in a reference data associated with driving behavior of a driver of the vehicle;

determining the driver is impaired driving in response to determining that a level of deviation of the value of the parameter included in the CAN data from the value of the parameter included in the reference data is greater than a threshold value;

changing the threshold value in response to determining that the location data indicates the vehicle is located in an area associated with a place offering access to alcohol;

determining the driver is impaired driving in response to determining that the level of deviation of the value of the parameter included in the CAN data from the value of the parameter included in the reference data is greater than the changed threshold value; and controlling operations of the vehicle in response to determining that the driver is impaired driving.

2. The method of claim 1, wherein the reference data is associated with previous driving behavior of the driver of the vehicle.

3. The method of claim 2, wherein the reference data is obtained based on the CAN data acquired from previous driving of the driver of the vehicle.

4. The method of claim 1, wherein the reference data is obtained based on a normal driving pattern learned from model data.

5. The method of claim 1, further comprising:

acquiring environmental data associated with an environment surrounding the vehicle; and modifying the reference data based on the environmental data.

6. The method of claim 5, further comprising:

determining the driver is impaired driving when a driving maneuver indicating that the driver is impaired driving is detected based on the CAN data and the environmental data.

7. The method of claim 1, further comprising:

processing an image of a view of the vehicle to identify a traffic sign;

selecting a parameter associated with the traffic sign; and comparing the selected parameter of the CAN data to reference data associated with the traffic sign.

8. The method of claim 1, further comprising:

processing an image of a view of the vehicle to identify another vehicle within a predetermined distance of the vehicle;

selecting a parameter associated with vehicle following behavior in response to the identification of the another vehicle within a predetermined distance of the vehicle; and comparing the selected parameter of the CAN data to reference data associated with the vehicle following behavior.

9. The method of claim 1, wherein the location data is acquired based on point of interest tracking information of the vehicle.

10. The method of claim 1, further comprising:

sending a notification when the driver is determined to be impaired driving.

11. The method of claim 1, further comprising:

activating a vehicle intervention system when the driver is determined to be impaired driving.

12. The method of claim 11, wherein the vehicle intervention system disables the vehicle such that the vehicle is no longer operable when the driver is determined to be impaired driving.

13. A system for determining impaired driving comprising:

a vehicle having a controller area network (CAN) system; and a controller configured to:

acquire CAN data and location data of the vehicle;

compare a value of a parameter included in the CAN data to a value of the parameter included in a reference data associated with driving behavior of a driver of the vehicle;

determine the driver is impaired driving when a level of deviation of the value of the parameter included in the CAN data from the value of the parameter included in the reference data is greater than a threshold value;

change the threshold value when the location data indicates the vehicle is located in an area associated with a place offering access to alcohol;

determine the driver is impaired driving in response to determining that the level of deviation of the value of the parameter included in the CAN data from the value of the parameter included in the reference data is greater than the changed threshold value; and control operations of the vehicle in response to determining that the driver is impaired driving.

14. The system of claim 13, wherein the reference data is associated with previous driving behavior of the driver of the vehicle.

15. The system of claim 13, wherein the reference data is obtained based on a normal driving pattern learned from model data.

16. The system of claim 13, wherein the controller is further configured to:

acquire environmental data associated with an environment surrounding the vehicle; and modify the reference data based on the environmental data.

17. The system of claim 16, wherein the controller is further configured to:

determine the driver is impaired driving when a driving maneuver indicating that the driver is impaired driving is detected based on the CAN data and the environmental data.

18. The system of claim 13, wherein the location data is acquired based on point of interest tracking information of the vehicle.

19. The system of claim 13, wherein the controller is further configured to:

activate a vehicle intervention system when the driver is determined to be impaired driving.

20. The system of claim 19, wherein the vehicle intervention system disables the vehicle such that the vehicle is no longer operable when the driver is determined to be impaired driving.

* * * * *